United States Patent
Becker et al.

(10) Patent No.: US 7,036,884 B2
(45) Date of Patent: May 2, 2006

(54) FOLDABLE REAR SEAT ARRANGEMENT FOR VEHICLES

(75) Inventors: Burckhard Becker, Solingen (DE); Wilfried Beneker, Leichlingen (DE)

(73) Assignee: C. Rob.Hammerslein GmbH & Co. KG, Solingen (DE)

( * ) Notice: Subject to any disclaimer, the term of this patent is extended or adjusted under 35 U.S.C. 154(b) by 0 days.

(21) Appl. No.: 11/118,252

(22) Filed: Apr. 29, 2005

(65) Prior Publication Data

US 2005/0264077 A1 Dec. 1, 2005

(30) Foreign Application Priority Data

Jun. 1, 2004 (DE) ............... 10 2004 026 930
Jan. 7, 2005 (DE) ............... 10 2005 001 042

(51) Int. Cl.
*B60N 2/02* (2006.01)

(52) U.S. Cl. .................. 297/378.1; 297/235

(58) Field of Classification Search .......... 297/188.04, 297/378.14, 378.1, 235, 238, 396, 391; 296/65.09, 296/64, 65.16, 65.17
See application file for complete search history.

(56) References Cited

U.S. PATENT DOCUMENTS

| 1,201,900 | A | * | 10/1916 | Wells ...................... 297/238 |
| 2,481,943 | A | * | 9/1949 | Murphy et al. ............ 297/238 |
| 5,681,080 | A | * | 10/1997 | Pond et al. ............ 297/188.05 |
| 5,863,092 | A | * | 1/1999 | Kifer .................... 297/188.04 |
| 5,913,570 | A | * | 6/1999 | Yoshida et al. ........ 297/378.14 |
| 6,089,641 | A | * | 7/2000 | Mattarella et al. ........... 296/64 |
| 6,270,141 | B1 | * | 8/2001 | Moon et al. ............. 296/65.17 |
| 6,406,084 | B1 | * | 6/2002 | de Campos et al. .......... 296/66 |
| 6,648,395 | B1 | * | 11/2003 | Hoshino ..................... 296/66 |
| 6,817,660 | B1 | * | 11/2004 | Ito et al. ..................... 297/15 |
| 6,860,550 | B1 | * | 3/2005 | Wojcik ..................... 297/163 |
| 2004/0061349 | A1 | * | 4/2004 | Drew et al. ............. 296/65.09 |

* cited by examiner

*Primary Examiner*—Milton Nelson, Jr.
(74) *Attorney, Agent, or Firm*—McCarter & English, LLP.

(57) ABSTRACT

A seat arrangement (16) for a vehicle comprises at least two vehicle seats (18, 20) arranged behind each other, each comprising a seat part (24) and a seat back (22), with the seat backs (22) being foldable against the associated seat part (24) into a cargo loading floor position for providing a cargo loading floor with at least the seat back (22) of the vehicle seat (20) located behind comprising a headrest (26). The seat back (22) of the vehicle seat (18) located in front comprises a recess (28) into which the headrest (26) of the vehicle seat (20) located behind is insertable in the loading floor position in such a manner that a substantially gapless loading floor may be formed.

11 Claims, 3 Drawing Sheets

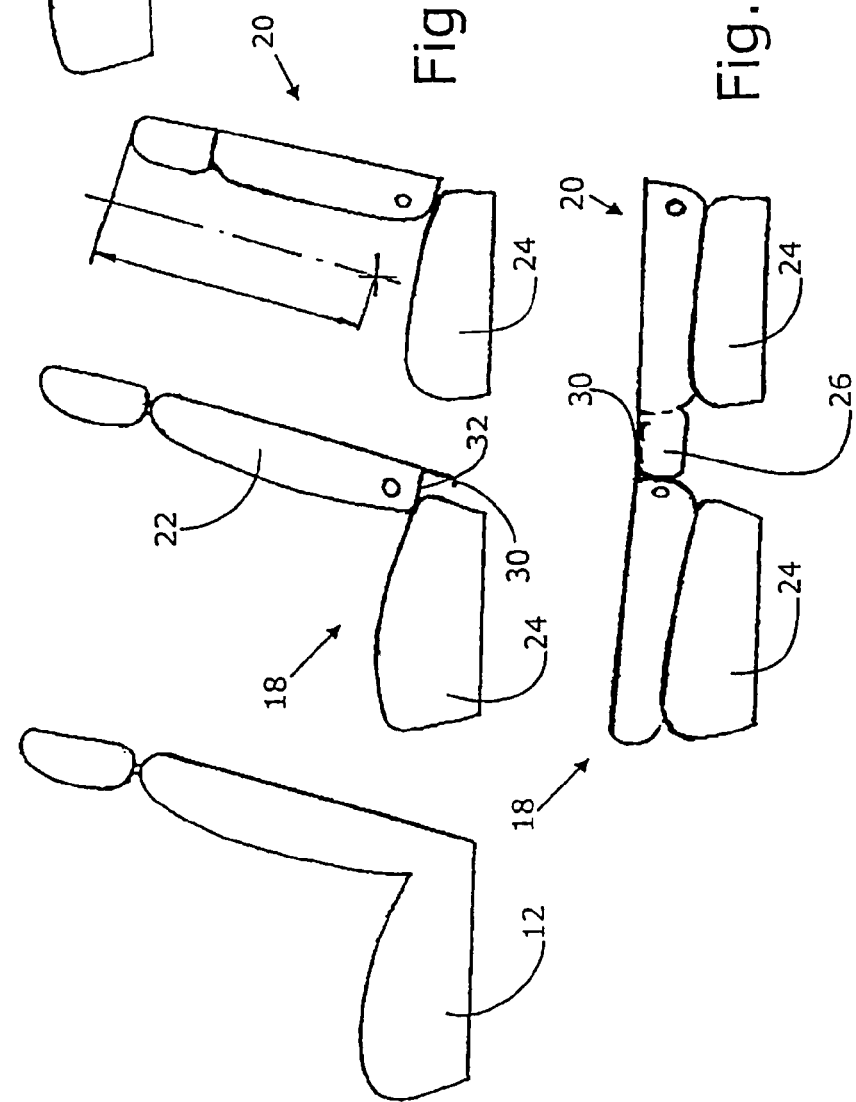

FOLDABLE REAR SEAT ARRANGEMENT FOR VEHICLES

FIELD OF THE INVENTION

The present invention relates to a seat arrangement for an automotive vehicle having at least two vehicle seats arranged behind each other, each comprising a seat part and a seat back, with the seat backs being foldable against the associated seat part into a cargo loading floor position for providing a cargo loading floor with at least the seat back of the vehicle seat located behind comprising a headrest.

DESCRIPTION OF THE RELATED ART

It has long been known to fold rear seats in order to increase the loading space of a vehicle. Especially with stretch limousines, small busses and vans, the seat arrangement leaves but quite little room left for loading behind the last row of seats. To increase said room, the rear vehicle seats may for example be dismounted and removed. The disadvantage thereof is the need for mounting, i.e., for releasing the various vehicle seats from their anchorage in the vehicle floor. Also, the removed vehicle seats need to be stored.

Alternatively, with some vehicle types the seat backs can be folded. This however causes the problem that the thus obtained loading surface is not continuous since a gap remains between the folded seat back and the seat located in front of it. Said gap can only be avoided by first removing the headrest of the folded seat back and by sliding the vehicle seat with the folded seat back into contact with the seat located in front of it. This method is also quite complicated and the headrests also need to be stored. Such a device also suffers a problem when the vehicle seats of the last row comprise integrated headrests that cannot be removed. In such a case, the gap is unavoidable. Moreover, rear seats often cannot be adjusted lengthwise.

SUMMARY OF THE INVENTION

It is the object of the present invention to implement the vehicle seats in a vehicle of the type mentioned herein above in such a manner that they can be most easily brought from a seat position into a loading position with the thus obtained loading space being intended to be the biggest possible. It is more specifically an object of the invention to provide an as far as practicable continuous, meaning gapless loading floor by folding the seat backs. This is to apply also to vehicle seats that cannot be adjusted lengthwise.

In accordance with the invention the object of the present invention is solved by a recess provided in the seat back of the vehicle seat located in front and into which the headrest of the vehicle seat located behind is insertable in the loading floor position in such a manner that a substantially gapless loading floor may be formed.

This means that the headrests of the seat backs to be folded need not be removed. They may now rather form themselves part of the loading floor as they may be fit into recesses provided at the front vehicle seat in such a manner that an as far as practicable continuous loading floor is provided. The invention is more specifically suited for seat backs with integrated headrests since these may comprise on their rear side, meaning on the side turned away from the cushion, a continuous, advantageously quite robust surface that will serve as the loading floor when folded.

The recess in the seat back of the front vehicle seat may either be integrated directly in the rear side of the seat back, meaning in the side that is turned toward the vehicle seat located behind, or be provided in an extended portion belonging to the seat back and extending toward the vehicle floor on an underside of the cushion part. This may be appropriate when the two vehicle seats are not or cannot additionally be moved toward each other to form the loading floor or in order to save the material costs involved with seat backs having an overlength. It only matters that the headrest of the vehicle seat located behind can be inserted when folded like a puzzle piece into the also flat folded seat back of the vehicle seat located in front.

The extended portion of the invention may be made from any suited material. Metal and plastic materials are for example a material of choice. Advantageously, the side of the extended portion that is turned away from the seat back is implemented so as to be formed inward toward the respective seat part. This permits to avoid formation of a free edge likely to disturb or injure a person seated therebehind and hitting the edge with her foot. Further, the extended portion is advantageously linked to an axis about which it is pivotal in the direction of the seat part. Advantageously, when the seat back is in the upright position, the extended portion is pivotal toward the seat part to which it may be snap-fitted so as to increase the leg room.

More specifically, the rear seat arrangement of the invention is perfectly suited for a second and third row of seats in a vehicle. The vehicle seats may for example be combined into bench seats. This means that the vehicle is not equipped with individual vehicle seats but with two bench seats for example. Said bench seats each comprise one single seat part and one common seat back. In order to form the desired loading floor, the two seat backs are folded and the headrests of the seat back located behind, usually three such headrests, engage into recesses provided on the seat back located in front.

Advantageously, the seat backs may also be implemented so as to be divided, thus allowing for folding but a portion of the seat back of a bench seat rather than the entire seat back. This makes sense when for example passengers and long goods are to be transported, meaning when passengers still occupy seats with elongate goods such as skis having to be accommodated as well.

In principle, the recess may also extend beyond the extended portion into the cushion part. In principle, it has the shape of the headrest of the vehicle seat located behind, but it may also be formed in such a manner that regions of the seat back of the rear vehicle seat may also be received therein. Advantageously, the recess is configured so as not to be visible on the side of the seat back that is to be used, meaning on the cushioned side thereof. In principle, and more particularly when the recess is disposed in the cushion part of the seat back, said recess is a dimple. If, by contrast, the recess is disposed in the extended portion, it may be configured as an aperture.

In principle, height-adjustable, individual headrests that may be engaged into the seat back are also suited, but integrated headrests are advantageous because they need not be brought into a certain position to match the recess of the vehicle seat located in front.

BRIEF DESCRIPTION OF THE DRAWINGS

Further advantages of the invention will become apparent from the following description and from the claims.

In the drawings:

FIG. 3 is a side view of the rear seat arrangement, FIG. 4 shows the rear seat arrangement of FIG. 3 with folded seat backs, FIG. 5 shows a second embodiment of the invention.

DETAILED DESCRIPTION

Figure 1:
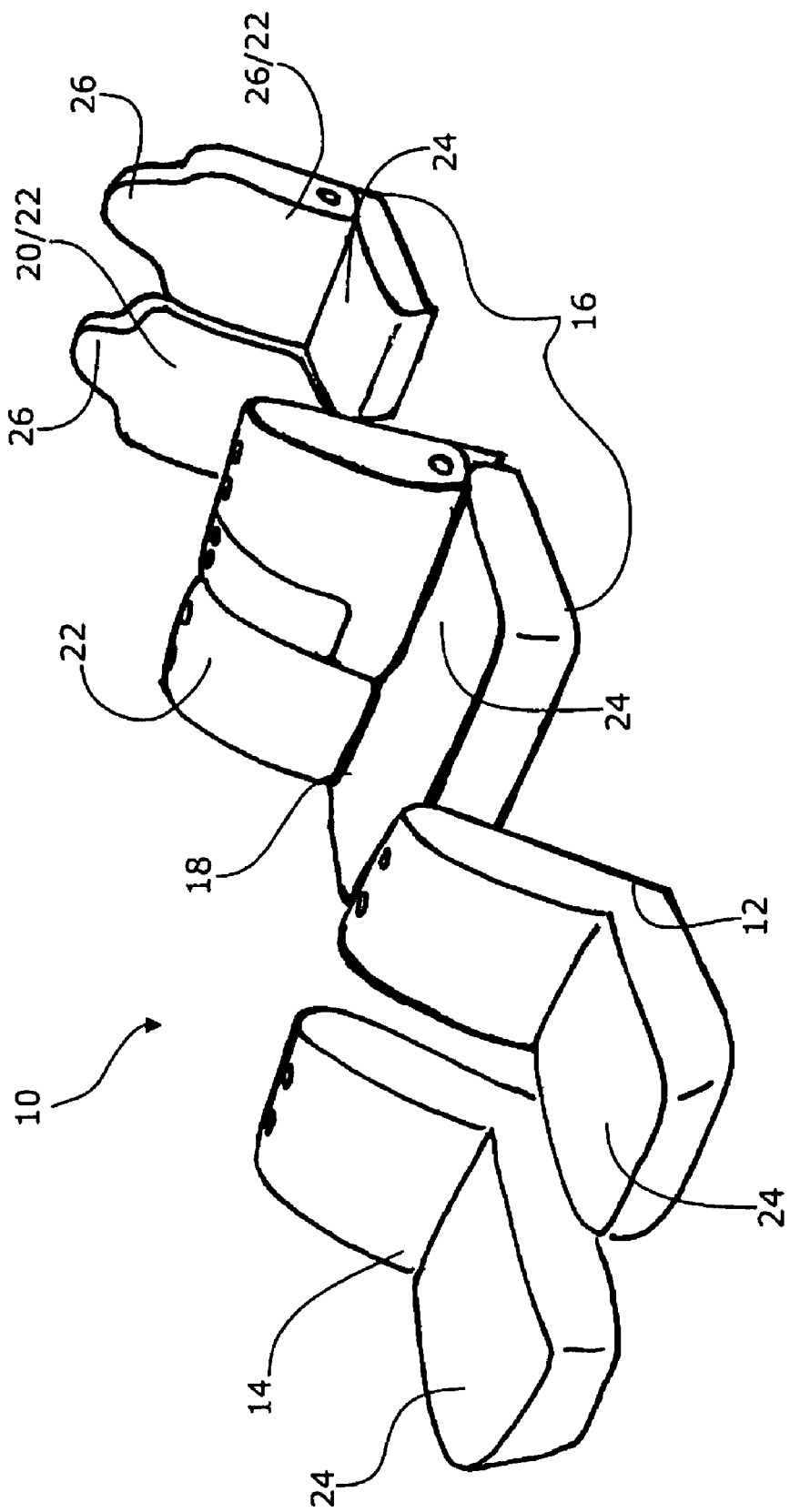
FIG. 1 shows a seat arrangement of a vehicle with upright seat backs.

FIG. 1 shows a schematic illustration of a seat arrangement 10 for a vehicle. Said seat arrangement comprises a driver's seat 12 and a passenger front seat 14 as well as a rear seat arrangement 16. The rear seat arrangement 16 is formed of a first vehicle seat 18 located in front and of a second vehicle seat 20 located behind. In the exemplary embodiment shown, the vehicle seat 18 located in front is implemented as a bench seat with a dividable seat back 22 whereas the vehicle seats 20 located behind each comprise their own seat back 22. All the seats 12, 14, 18, 20 comprise a seat part 24. A headrest 26 is additionally disposed on each of the vehicle seats located behind 20, said headrest being configured as an integrated headrest 26 in the exemplary embodiment shown.

Figure 2:
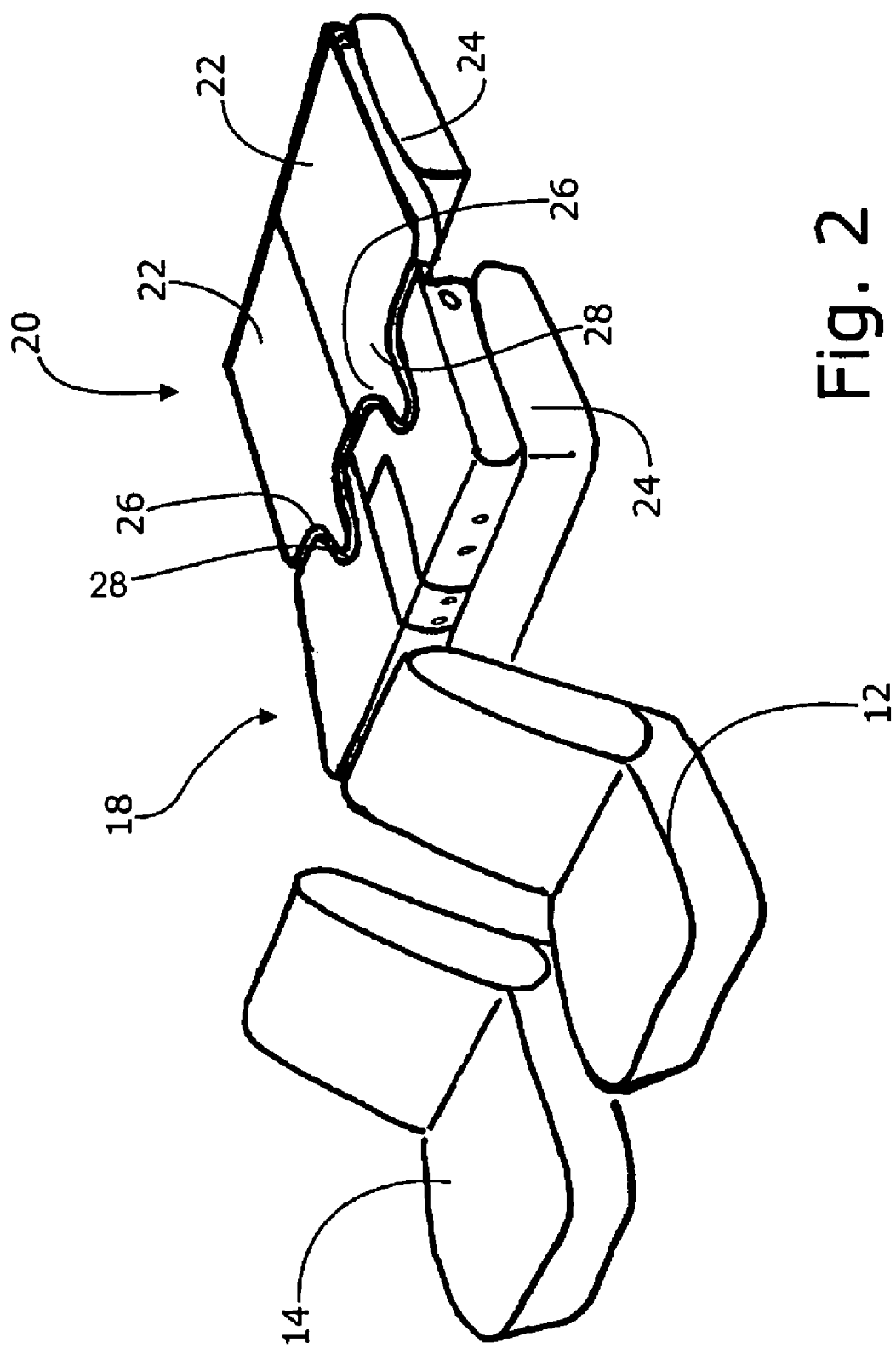
FIG. 2 shows the seat arrangement of FIG. 1 with the seat backs of the rear seat arrangement being folded.

FIG. 2 shows the seat arrangement 10 with the seat backs 22 of the rear seat arrangement 16 being folded. It can be readily seen that the headrests 26 are inserted into recesses 28. In this loading floor position, a substantially continuous gapless loading floor is thus formed in accordance with the invention. The important point is that the recesses 28 conform to the shape of the headrests 26.

The FIGS. 3 and 4 illustrate an exemplary embodiment of the invention. Accordingly, an extended portion is formed on the seat back 22 of the vehicle seat 18 located in front, said extended portion extending from a lower edge 32 of the seat back 22 toward a vehicle floor that has not been illustrated herein. The recess 28 is formed in the extended portion 30 and in the seat back 22, as best shown in FIG. 4. From FIG. 4 it can also be seen that the two vehicle seats 18, 20 are implemented and arranged relative to each other so as to obtain a continuous and gapless loading floor when the seat backs 22 are folded. Alternatively, the recess 28 may be provided only in the seat back 22 or only in the extended portion 30.

Whether an extended portion 30 is needed will depend, inter alia, on the spacing between the two vehicle seats 18, 20.

Advantageously, the extended portion 30 comprises at its free end a region that is formed inward toward the seat part 24. Said region prevents a passenger occupying the vehicle seat 20 located behind from being injured or disturbed by an edge that would be sharp but for this feature.

FIG. 5 shows another embodiment of the invention. It shows the vehicle seat 18 located in front. In this case, the recess 28 is not inserted into an extended portion 30 but solely is an integral part of the seat back 22 or of its cushion part 34. Accordingly, the seat back is not formed from the cushion part 34 and from an extended portion 30. The recess is a dimple formed in a rear side 36 of the seat back 22 and is shown in a dashed line. Accordingly, the two seats 18, 20 must be arranged in closer proximity to each other or the vehicle seat 20 located behind must be displaced toward the vehicle seat 18 located in front when in the loading floor position.

The rear sides 36 of the seat backs 22 forming the loading floor are advantageously made from a strong material for the loading floor to be accordingly loadable.

The invention is not limited to the exemplary embodiments described that are given by way of example and for the purpose of description only.

The invention claimed is:

1. A seat arrangement for an automotive vehicle comprising:
    a first vehicle seat and a second vehicle seat, the second vehicle seat being arranged behind the first vehicle seat,
    each vehicle seat comprising a seat part and a seat back, both the seat back of the first vehicle seat and the seat back of the second vehicle seat being foldable against the respective seat part into a cargo loading position for providing a cargo loading floor, at least the seat back of the second vehicle seat comprising a headrest,
    wherein the seat back of the first vehicle seat comprises a recess, the recess being adapted to the headrest of the second vehicle seat and in the loading floor position the headrest of the second vehicle seat fits in the recess whereby a substantially gapless loading floor is formed.

2. The seat arrangement as set forth in claim 1, wherein the headrest is implemented as one of a height-adjustable headrest or as an integrated headrest.

3. The seat arrangement as set forth in claim 1, wherein at least one of the vehicle seats is implemented as a bench seat.

4. The seat arrangement as set forth in claim 3, wherein at least one of the seat back of the first vehicle seat and the seat back of the second vehicle seat is implemented to be dividable.

5. The seat arrangement as set forth in claim 1, wherein the seat back is formed of a cushion part and of an extension portion, the recess being integrated at least in the extension portion and the extension portion joining a lower edge of the seat back and extending toward a vehicle floor.

6. The seat arrangement as set forth in claim 5, wherein the headrest is implemented as one of a height-adjustable headrest or as an integrated headrest.

7. The seat arrangement as set forth in claim 5, wherein the extension portion is formed in such a manner that a free edge of the extension portion is directed toward the seat part of the first vehicle seat.

8. The seat arrangement as set forth in claim 5, wherein, when the seat back is in the upright position, the extension portion is pivotal toward the seat part and may be snap-fitted in a position in proximity to the seat part.

9. The seat arrangement as set forth in claim 5, wherein at least one of the vehicle seats is implemented as a bench seat.

10. The seat arrangement as set forth in claim 9, wherein at least one of the seat back of the first vehicle seat and the seat back of the second vehicle seat is implemented to be dividable.

11. An extension portion and a seat back of a first vehicle seat of a seat arrangement for an automotive vehicle comprising the first vehicle seat and a second vehicle seat arranged behind the first vehicle seat, each vehicle seat comprising a seat part and a seat back, the seat backs being foldable against the seat parts into a cargo loading position for providing a cargo loading floor, at least the seat back of the second vehicle seat comprising a headrest, the extension portion joining a lower edge of the seat back of the first vehicle seat extends toward a vehicle floor and comprises a recess, the recess is adapted to the headrest of the second vehicle seat and in the loading floor position the headrest of the second vehicle seat fits in the recess whereby a substantially gapless loading floor is formed.

* * * * *